United States Patent [19]

Drummond et al.

[11] 4,063,662

[45] Dec. 20, 1977

[54] CALIBRATING MEANS FOR A MICRODISPENSER

[75] Inventors: Michael E. Drummond, West Chester, Pa.; John E. Robinson, Springfield, Va.

[73] Assignee: Drummond Scientific Company, Broomall, Pa.

[21] Appl. No.: 703,533

[22] Filed: July 8, 1976

[51] Int. Cl.² .............................................. B67D 5/22
[52] U.S. Cl. .................................... 222/31; 128/218 C
[58] Field of Search ......... 128/218 P, 218 PA, 218 C; 222/386, 49, 390, 47, 391, 31; 73/429

[56] References Cited

U.S. PATENT DOCUMENTS

| 3,417,904 | 12/1968 | McLay ............................... 128/218 C |
| 3,606,086 | 9/1971 | Drummond et al. ............. 128/218 C |
| 3,730,389 | 5/1973 | Harris et al. .................... 128/218 C X |
| 3,831,602 | 8/1974 | Broadwin ..................... 128/218 C X |

Primary Examiner—Allen N. Knowles
Assistant Examiner—Norman L. Stack, Jr.
Attorney, Agent, or Firm—Shlesinger, Arkwright, Garvey & Dinsmore

[57] ABSTRACT

Calibrating means for a microdispenser of the type wherein a plunger is operable to automatically draw a fixed volume of fluid into, and expel the liquid from, a precision capillary tube. The calibrating means includes a graduation marking on the capillary tube indicating the precise, predetermined quantity of fluid to be drawn into the tube. Calibration is effected by varying the degree of engagement of the microdispenser end cap with the microdispenser barrel, which effects corresponding longitudinal movement of the plunger with respect to the capillary tube until the outer terminal thereof is aligned with the graduation marking on the capillary tube. Friction means are provided for preventing accidental movement of the end cap after the calibration adjustment has been made.

10 Claims, 8 Drawing Figures

U.S. Patent  Dec. 20, 1977  4,063,662
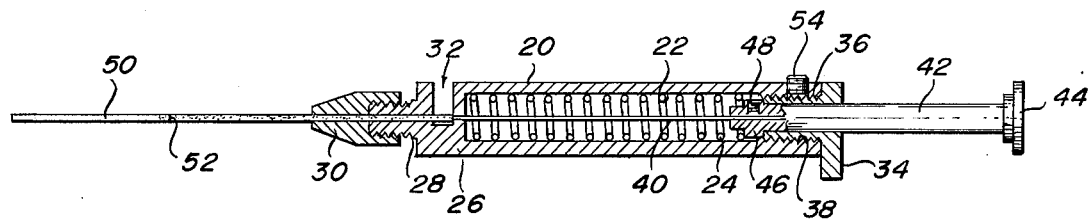
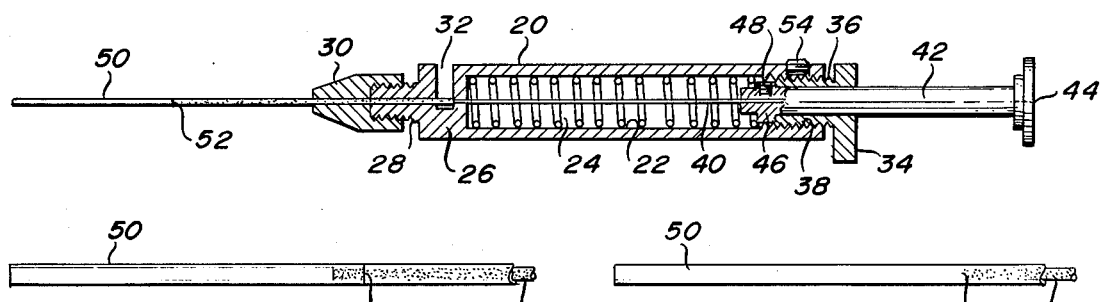
 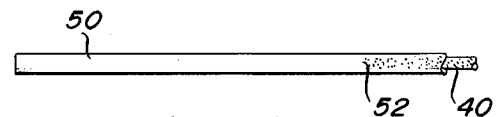
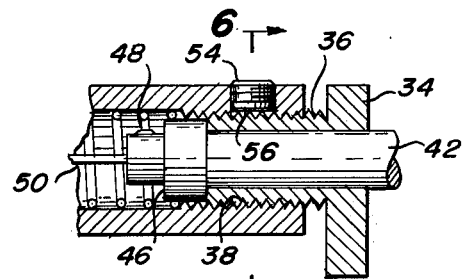 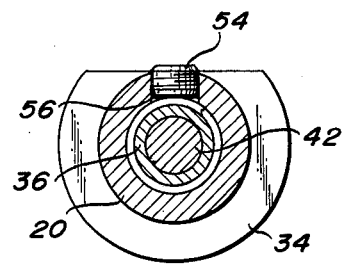
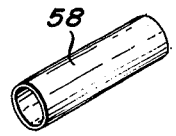
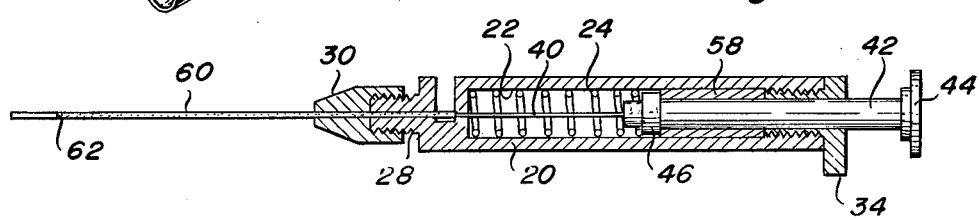

(56)

CALIBRATING MEANS FOR A MICRODISPENSER

BACKGROUND OF THE INVENTION

In the use of the microdispenser set out in our previously granted U.S. Pat. Nos. 3,606,086 and Re 27,645, a fixed volume of fluid may be delivered by the microdispenser by permitting the plunger thereof to travel through the entire length of its stroke. Fixed volumes of fluid of lesser amount may also be delivered by placing inserts within the barrel of the microdispenser, to shorten the length of the plunger stroke and correspondingly reduce the amount of fluid drawn into the capillary tube. However, the microdispenser of our previous invention is particularly adapted to handle very small amounts of fluid, and it is extremely difficult to deliver the predetermined amounts of fluid with the precision required in some laboratory work, since small deviations in the amounts of fluid drawn into the capillary tube can occur when parts of the microdispenser are replaced, or for other reasons.

SUMMARY OF THE INVENTION

The present invention comprises simple means for calibrating a standard microdispenser to deliver a precise, predetermined amount of fluid, the calibration being carried out by means of a precision capillary tube having a graduation marking thereon to indicate the precise amount of fluid to be drawn into the capillary tube, and wherein calibration is effected by adjustment of an end which is threadedly engaged with the barrel of the microdispenser. This effects a corresponding longitudinal adjustment of the plunger within the capillary tube until the outer end thereof is aligned with the graduation marking.

The invention further contemplates the calibration of a standard microdispenser in the manner above described, and wherein friction means are provided for holding the component parts thereof in the position of calibration adjustment without accidental relative movement of the parts thereof during use.

DESCRIPTION OF FIGURES OF THE DRAWINGS

FIG. 1 is a side elevational view of a microdispenser embodying the calibrating means of the present invention, a portion thereof being broken away to disclose details, and wherein the microdispenser is shown prior to calibration;

FIG. 2 is a view similar to FIG. 1 showing the microdispenser after the calibration adjustment;

FIG. 3 is an enlarged fragmentary side elevational view of the capillary tube forming a part of the present invention, showing the microdispenser plunger in the non-calibrated position of FIG. 1;

FIG. 4 is a view similar to FIG. 3 showing the plunger after a calibration adjustment;

FIG. 5 is an enlarged fragmentary sectional view of a portion of the microdispenser of FIG. 1, illustrating the manner of calibrating the microdispenser;

FIG. 6 is a sectional view taken along the line 6—6 of FIG. 5, looking in the direction of the arrows;

FIG. 7 is a perspective view of a cylindrical insert adapted to be inserted into the microdispenser, and FIG. 8 is a fragmentary sectional view showing the microdispenser with the cylindrical insert of FIG. 7 positioned therein.

DETAILED DESCRIPTION OF THE INVENTION

Referring now to the drawings, and more particularly to FIGS. 1 and 2, there is illustrated a microdispenser of the type disclosed in U.S. Pat. Nos. 3,606,086 and Re 27,645, which includes a cylindrical barrel 20 having an axial bore 22 in which is positioned a convolute spring 24.

One end of barrel 20 is closed by an end wall 26. Forwardly of the wall there is provided a cylindrical central extension 28, the outer periphery of which is threaded for engagement with a collet 30. At a point spaced, but adjacent to, axial bore 22 a semi-circular segment of wall 26 is cut away as indicated at 32, the cut away section extending from the outer periphery of the wall to a point just beyond the longitudinal axis of the bore.

At the opposite end of barrel 20, an end cap 34 having a central, reduced threaded extension 36 is threadedly engaged with the internal wall of the barrel as indicated at 38.

A plunger 40 extends axially through bore 22 of barrel 40, extension 28 and collect 30 to a point beyond the latter. The opposite end of plunger 40 is held by a plunger holder 42 which extends through end cap 34 and threaded extension 36. A finger pad 44 is frictionally engaged with the outer end of plunger holder 42. Plunger holder 42 is of uniform diameter throughout a substantial portion of its length, but inwardly of barrel 20 is provided with an annular enlargement comprising a stop 46 against which convolute spring 24 impinges to urge the plunger holder and plunger outwardly of barrel 20. Plunger 40 is held in plunger holder 42 by suitable set screw means 48.

In accordance with the present invention, a capillary tube 50, the diameter of the inner bore of which is substantially equal to the diameter of plunger 40, is inserted through collet 30, extension 28 and partially through end wall 26 of barrel 20. As shown in FIGS. 1 and 2, capillary tube 50 passes through cut away segment 32, abuts that portion of end wall 26 adjacent thereto, at which point the capillary tube is properly positioned for use. Capillary tube 50 is provided with a graduation marking 52 for indicating a precise quantity of fluid when the capillary tube is filled to that point. Capillary tube 50 and the microdispenser are so coordinated in construction that when plunger 40 and plunger holder 42 are urged to their outermost position by spring 24 the outer end of plunger 40 is, in theory, aligned with graduation marking 52.

However, due to the fact that parts of the microdispenser, such as the plunger are replaceable, and because of minor variations in the equipment itself, it frequently happens that the tip of plunger 40 is not aligned with graduation marking 52. In FIG. 1, there is illustrated the situation where the tip of plunger 40 extends beyond graduation marking 52.

It is the salient feature of the present invention to quickly and efficiently calibrate the microdispenser to effect adjustment of plunger 40 until the terminal thereof is aligned with marking 52.

Referring now to FIGS. 1 and 2, adjustment is effected by changing the relationship of end cap 34 to barrel 20 by loosening or tightening the threaded engagement of the end cap with the barrel. This effects a corresponding longitudinal movement of plunger 40 and plunger holder 42 in one direction under urging of convolute spring 24 or in the other direction by threaded engagement of the end cap further into the barrel. This movement is continued in the desired direction until the tip of plunger 40 and graduation marking 42 are aligned.

In order to maintain the microdispenser in its calibrated position, there is provided a locking mechanism shown to advantage in FIGS. 5 and 6. This locking mechanism includes a set screw 54 which extends through the wall of cylindrical barrel 20 near one end thereof and proximate the location of the threaded engagement of end cap 34 with the barrel. A soft pad 56 is disposed between set screw 54 and the threads of extension 36 which pad may be made of plastic, leather or other suitable soft material. As set screw 54 is threaded into barrel 20, pad 56 becomes frictionally engaged with the threads of extension 36 to prevent accidental rotation of end cap 34 with resultant misadjustment of the microdispenser.

In FIGS. 7 and 8 of the drawings, there is illustrated the manner of use of the present invention for delivering a fixed, but lesser amount of fluid than shown and described in connection with FIGS. 1 to 6. For this purpose, there is provided a cylindrical insert 58 which is placed in sleeved engagement with plunger holder 42 and located between stop 46 and threaded extension 36 of end cap 34, as shown in FIG. 8. Positioning of insert 58 is effected by removing finger pad 44 and then unscrewing and removing end cap 34 from barrel 32.

As shown in FIG. 8, when insert 58 is positioned in barrel 20, it shortens the stroke of plunger 40 within capillary tube 60, and consequently a lesser amount of fluid is delivered than with the microdispenser shown in FIGS. 1 to 6.

Capillary tube 60 is provided with a graduation marking 62 for indicating when a predetermined volume of liquid is drawn into the tube.

In order that the fluid may be delivered in a fixed, precise volume, cylindrical insert 58 is of a predetermined length so that the tip of plunger 40 is approximately aligned with graduation marking 62 when the microdispenser plunger is in retracted position.

Just as in the form of invention illustrated in FIGS. 1 to 6, calibration of this microdispenser may be effected by adjustment of end cap 34 and securement thereof in the adjusted position by tightening set screw 54.

It is also within the contemplation of the present invention to provide inserts of different sizes and capillary tubes having markings thereon corresponding thereto so that fluids in fixed amounts, but of different quantities, may be delivered by a standard microdispenser.

The calibrating arrangement of the present invention provides a simple but effective method of modifying a standard microdispenser to insure that precise quantities of fluid of a fixed volume are delivered by the microdispenser, thereby enabling the use thereof for precision type laboratory work.

While there has been herein shown and described the presently preferred form of this invention, it is to be understood that this has been done for purposes of illustration only, and that various changes may be made therein within the scope of the appended claims.

What is claimed is:

1. A microdispenser having calibrating means, comprising:
   a. a cylindrical barrel having an axial bore,
   b. a removable end cap having a portion frictionally engaged with one end of said barrel,
   c. a plunger assembly movable longitudinally through said cylindrical barrel and end cap,
   d. means for urging said plunger assembly in the direction of said end cap,
   e. stop means on said plunger assembly engageable with said end cap for limiting the longitudinal movement of said plunger assembly through said end cap,
   f. tube means,
   g. means for positioning said tube means in the end of said cylindrical barrel opposite the end cap, to receive said plunger assembly,
   h. indicia means on said tube means for indicating the amount of fluid to be drawn into said tube means,
   i. said removable end cap being longitudinally relocated with respect to said cylindrical barrel, for effecting corresponding longitudinal movement of said plunger assembly in said tube means, to align one end of said plunger assembly with the indicia means on said tube means, whereby a predetermined, precise volume of fluid is delivered upon actuation of the plunger assembly, and
   j. locking means engageable with said end cap for maintaining the latter in fixed position with respect to said cylindrical barrel.

2. The microdispenser of claim 1, wherein:
   a. said tube means is a capillary tube.

3. The microdispenser of claim 1, wherein:
   a. said indicia means comprises a graduation mark.

4. The microdispenser of claim 1, wherein:
   a. said locking means includes a friction member between said cylindrical barrel and a portion of said end cap to prevent accidental relative movement therebetween.

5. The microdispenser of claim 1, wherein:
   a. said end cap includes a cylindrical portion,
   b. said cylindrical portion being externally threaded and the inner end portion of said cylindrical portion being complementally threaded, to effect threaded engagement of said end cap with said cylindrical barrel, and
   c. said locking means includes a friction member engageable with the threads of said cylindrical portion for preventing relative movement of said end cap with respect to said cylindrical barrel.

6. The microdispenser of claim 5, wherein:
   a. said locking means includes set screw threaded through said cylindrical barrel for engagement with the threads of said cylindrical portion of the end cap.

7. The microdispenser of claim 6, wherein:
   a. a friction pad is inserted between said set screw and the threads of the cylindrical portion of said end cap for increasing the friction therebetween.

8. A microdispenser having calibrating means comprising:
   a. a cylindrical barrel having an axial bore,
   b. an end cap threadedly engaged with one end of said cylindrical barrel,
   c. a plunger assembly movable longitudinally through said cylindrical barrel and end cap,
   d. spring means for urging said plunger assembly in the direction of said end cap,
   e. stop means on said plunger assembly engageable with said end cap for limiting the longitudinal movement of said plunger assembly through said end cap,
f. a capillary tube,
g. means for positioning said capillary tube in the end of said cylindrical barrel opposite the end cap to receive said plunger assembly,
h. a graduation mark on said capillary tube for indicating the amount of fluid to be drawn into said capillary tube,
i. said removable end cap being longitudinally relocated with respect to said cylindrical barrel, by threading said end cap into or out of said cylindrical barrel, for effecting corresponding longitudinal movement of said plunger assembly in said capillary tube, to align one end of said plunger assembly with the graduation mark on said capillary tube, whereby a predetermined, precise volume of fluid is delivered upon actuation of the plunger assembly, and
j. locking means engageable with said end cap for maintaining the latter in fixed position with respect to said cylindrical barrel.

9. The microdispenser of claim 8, wherein:
a. said end cap includes a cylindrical portion,
b. said cylindrical portion being externally threaded and the inner end portion of said cylindrical portion being complementally threaded, to effect threaded engagement of said end cap with said cylindrical barrel, and
c. said locking means includes a friction member engageable with the threads of said cylindrical portion for preventing relative movement of said end cap with respect to said cylindrical barrel.

10. The microdispenser of claim 8, with the addition of:
a. an insert selectively placed in said cylindrical barrel in sleeved relation with said plunger assembly between said stop means and said end cap for limiting the stroke of the plunger assembly and therefore regulate the amount of liquid delivered by said capillary tube,
the graduation mark on said capillary tube being coordinated with the size of said insert, to indicate a predetermined, precise volume of fluid is delivered upon actuation of the plunger assembly.

* * * * *